United States Patent [19]

Braun

[11] Patent Number: 5,273,153

[45] Date of Patent: Dec. 28, 1993

[54] DISPLAY TRAY, PROCESS FOR ITS MANUFACTURE

[76] Inventor: Reiner Braun, Vogelsangstrasse 41, 7540 Neuenbürg, Fed. Rep. of Germany

[21] Appl. No.: 71,603

[22] Filed: Jun. 4, 1993

Related U.S. Application Data

[63] Continuation of Ser. No. 778,091, Dec. 12, 1991, filed as PCT/DE90/00453, Jun. 13, 1990.

[30] Foreign Application Priority Data

| Jun. 15, 1989 | [DE] | Fed. Rep. of Germany | 3919517 |
| Jul. 4, 1989 | [DE] | Fed. Rep. of Germany | 8908130 |
| Jul. 22, 1989 | [DE] | Fed. Rep. of Germany | 8908935 |
| Nov. 21, 1989 | [DE] | Fed. Rep. of Germany | 3938558 |
| Dec. 5, 1989 | [DE] | Fed. Rep. of Germany | 3940151 |
| Mar. 27, 1990 | [DE] | Fed. Rep. of Germany | 9003525 |

[51] Int. Cl.⁵ .................. B65D 81/16; A47F 3/14
[52] U.S. Cl. ................... 206/45.19; 206/561; 206/566; 206/495; 206/6.1; 428/160; 428/172; 264/46.4
[58] Field of Search ........... 206/45.14, 45.19, 6.1, 206/566, 460, 495, 561; 428/160, 172, 36.5; 264/46.4; 156/79; 53/472, 561

[56] References Cited

U.S. PATENT DOCUMENTS

| 3,804,239 | 4/1974 | O'Brien | 206/566 X |
| 4,119,749 | 10/1978 | Roth et al. | 428/160 X |
| 4,153,154 | 5/1979 | Ruscher | 206/566 X |
| 4,181,224 | 1/1980 | Aber | 206/566 X |
| 4,718,153 | 1/1988 | Armitage et al. | 156/79 X |
| 4,874,446 | 10/1989 | Elkin | 206/566 X |
| 4,944,389 | 7/3190 | Robertson | 206/566 X |
| 4,995,926 | 2/1991 | Urai | 156/79 X |

OTHER PUBLICATIONS

English translation of the Preliminary International Exmination Report

Primary Examiner—Paul T. Sewell
Assistant Examiner—Jacob K. Ackun, Jr.
Attorney, Agent, or Firm—Nikaido, Marmelstein, Murray & Oram

[57] ABSTRACT

Display tray with a display section (2) for mounting pieces of jewellery and a strengthened edging (3). A considerable weight saving and reduction of the manufacturing cost without impairment of the display function is achieved by the edging (3) having a core (7) of rigid foam material and a covering (8) of plastic sheeting.

11 Claims, 4 Drawing Sheets

DISPLAY TRAY, PROCESS FOR ITS MANUFACTURE

This application is a continuation of application Ser. No. 07/778,091 filed Dec. 12, 1991, filed as PCT/DE90/00453, Jun. 13, 1990.

The invention relates to a display tray with a display section, having a supporting sheet, for mounting objects for display and an edging, thickened in relation to the display section, and a process for its manufacture.

Display trays are used to display the objects for display in a visually attractive way. The invention is directed in particular towards the display of pieces of jewellery (including watches) and spectacles. In jewellers, shops, jewellery cabinets with a large number of removable trays are used. Display trays are often specifically adapted to a transportable sample case for commercial travellers. Such a sample case also contains a large number of trays.

The invention relates in particular to display trays for such objects for display as have a weight which is small in relation to that of the display tray.

The trays according to the invention are suitable in particular for use in conjunction with the transportable sample cases mentioned. In the following text reference is made for example, without restriction of generality, to jewellery display trays, which are also referred to in short as jewellery trays.

The display section is adapted to the purpose concerned. Frequently it simply consists of a flat surface which can be suitably divided by crosspieces into several compartments (e.g. for bracelets, pendants and wristwatches). Such trays are referred to below as compartmentalized trays. Jewellery trays for ring-shaped pieces of jewellery ("ring trays") have on the display surface ring sockets, surrounded by elastic foamed material, for mounting the rings in the upright position. For some purposes, specially profiled display pieces are also used. Thus for example display pieces for necklaces have a profile similar to the human neck.

The known jewellery trays are largely manufactured by hand. The supporting sheet of the display section and the edging usually consist of wood, which is provided with a decorative covering, e.g. of fabric or artificial leather. Such trays are indeed visually attractive and therefore well satisfy the display function. But their handling leaves something to be desired. Also their manufacture is demanding and consequently costly.

A jewellery tray is known from DE-U-86 13 991 which makes simplified manufacture possible. Here the edging consists of four sturdy plastic mouldings, of which two are manufactured by the injection moulding process and two as extruded hollow shapes. This is associated with a high cost.

Ring trays usually have a covering panel provided with rectangular recesses, two mutually abutting cushion bodies being so disposed under each of the recesses that the dividing line between the cushion bodies, into which the ring is stuck, runs along the longitudinal centre line of the recess. The cover plate and the cushion bodies sit in a flat box and the whole tray is usually lined with leather or a velvet-like textile material. A modified embodiment is described in DE-U 68 00 584. There the cushion bodies are formed as cushioning rods which extend over the whole width of the tray. In addition, the rods sit in a box formed as usual from a frame with a base.

The invention is based on the problem of making available a display tray which satisfies high aesthetic requirements, has the necessary structural properties, especially with regard to stability and torsion resistance, and at the same time has improved handling properties.

The problem is solved with a display tray of the kind referred to at the start in that the edging has a core of rigid foamed material and a covering of plastic sheeting.

The cementing to a rigid foam moulding of a covering of various materials, including sheeting, is a constructional step known from rigid foam packagings (e.g. DE-A-25 23 310 and DE-U-74 25 493).

The invention makes possible a considerable saving in weight. This is of great practical importance above all for jewellery trays for commercial travellers' sample cases.

In addition shaping of the edging of the tray adapted to the specific requirements is possible without further complication. For example a stacking groove can be provided, with the aid of which several jewellery trays can be stacked without slipping. The shaping can also be adapted without difficulty to aesthetic requirements, for example by using round edges or a rounded-off side face.

Surprisingly, these important advantages can be achieved simultaneously with reduced manufacturing costs without impairing the stability or the display function. The composite structure of plastic sheeting and rigid foamed material gives the edging high stability. This contributes considerably to the fact that, despite the low-density rigid foam material, a "cheap" impression detrimental to the display function is avoided. The visual appearance can also be influenced by the form of the covering sheet. For preference this exhibits leather embossing or flocking.

A rigid foam panel or a rigid foam moulding can serve as the supporting sheet of the display section, and can advantageously pass over in one piece into the rigid foam profile of the edging. This is suitable for ring trays, though a certain minimum strength of the display section is required in order to ensure the required stability.

According to an embodiment preferred for compartmentalized trays in particular, the display section has a separate supporting sheet which consists of a material of higher density and strength than that of rigid foamed material. In this way, particularly flat, space-saving, jewellery trays can be made. Suitable for example are a plastic panel or a wood-based laminated material (plywood, pressboard, moulded fibre and the like). A sturdy thin cardboard surprisingly proves particularly suitable.

The plastic sheeting covers the rigid foam core (in contrast to DE-A-25 23 310 and DE-U-74 25 493) preferably on at least three sides, namely the top side, the bottom side and the side face facing away from the display section. The rigid foam material of the edging should be completely covered and consequently invisible.

It is advantageous for compartmentalized trays if the covering of plastic sheeting covers the display section and the crosspieces for separating the compartments are impressed into the plastic sheet. It is advantageous for all types of tray if the covering of plastic sheeting is bonded to the supporting sheet directly or indirectly, at least in the neighbourhood of the edge, to form a layered composite structure. The joint is advantageously made by cementing (not necessarily over the whole area). In such a tray, the edging thus consists of a layered composite structure of rigid foam and plastic sheeting and the display section, at least at the edge, of a layered composite structure of the plastic sheeting with the supporting sheet. Such a tray is distinguished by an ideal combination of high strength, low overall height, low weight and attractive appearance.

The rigid foamed material from which the rigid foam core is made must be relatively strong. It preferably satisfies the German Industrial Standard (DIN) 7726 in the version of May 1982. The density should be more than 65 kg/M³. Polystyrene or polypropylene in particular can be used as the material.

The material of the covering sheeting is preferably so hard and strong that a sheeting body made from it is stable in shape even without a core. Especially suitable is a plastics material proof against compression, tension and impact, especially ABS (acrylonitrile butadiene) or polystyrene. The thickness of the covering sheeting is preferably between 0.2 and 0.8 mm, between 0.3 and 0.6 mm being especially preferred.

According to the preferred manufacturing process, a moulding of the desired shape for the tray edging is made by foam moulding from rigid foamed material. The plastic sheeting is moulded —preferably by drawing —from a thermoplastic material to a sheeting body whose shape is adapted to that of the rigid foam body. The rigid foam core and covering sheeting are preferably bonded by cementing, when a large part of the surface should be cemented. The rigid foam core can be reinforced with a material of greater strength, but this is not necessary and is less preferred.

A preferred ring tray has a ring-holding panel of foamed material, in which slits are cut as ring sockets. The edging is part of a flat composite moulding, of which at least 50% by volume consists of rigid foam, the ring-holding panel being fastened to the top side of the composite moulding in the display section surrounded by the edging. Under the slits in the ring-holding panel, the composite moulding has recesses accessible from its top surface for accommodating ring-shaped pieces of jewellery inserted into the slits.

The foamed material of the ring-holding panel should be relatively fine-pored and dense. A density between 20 and 80 kg/M³ is especially preferred. A highly expanded crosslinked foamed material, especially one based on polyethylene or a polyethylene copolymer, has proved especially suitable, although another foamed material, especially one based on polyurethane, can also advantageously be used.

According to a preferred embodiment, the ring-holding panel consists of a layered composite structure of the foamed material and a skin of a textile material, in which the textile material should preferably be elastic in both planar directions. The invention also includes, however, embodiments in which the foamed material is used without an additional skin, its surface being visible. This leads to a saving of cost and weight. It has surprisingly been found that an attractive appearance can be achieved even without a skin, especially if a heat-formable material, formed with application of pressure and temperature ("embossed"), is used. In this case it is advantageous to provide the surface with a fine-structured embossed pattern. This is preferably done with the aid of a "nylon print process". In this the desired fine structure, which preferably simulates a velvet-like textile texture or leather embossed pattern, is transferred photographically to a nylon film, which is inserted into the embossing mould during the hot forming of the jewellery cushion. It is also possible to flock-finish the foam material of the ring-holding panel directly.

Where the ring-holding panel has the form of a layered composite structure of a foamed material base layer and a textile skin, these layers are preferably bonded together by cementing over the whole surface.

The thickness of the ring-holding panel is preferably less than 6 mm, between 2 and 4 mm being especially preferred. This small thickness leads to a low weight. Nevertheless, the rings are held securely.

The ring-holding panel preferably consists of the foamed material layer only or of the two-layer composite structure. It can possibly also be useful, however, to provide additional further layers, for example an additional covering or underlay.

The invention is explained in more detail below with the aid of an embodiment shown diagrammatically in the figures.

Figure 1:
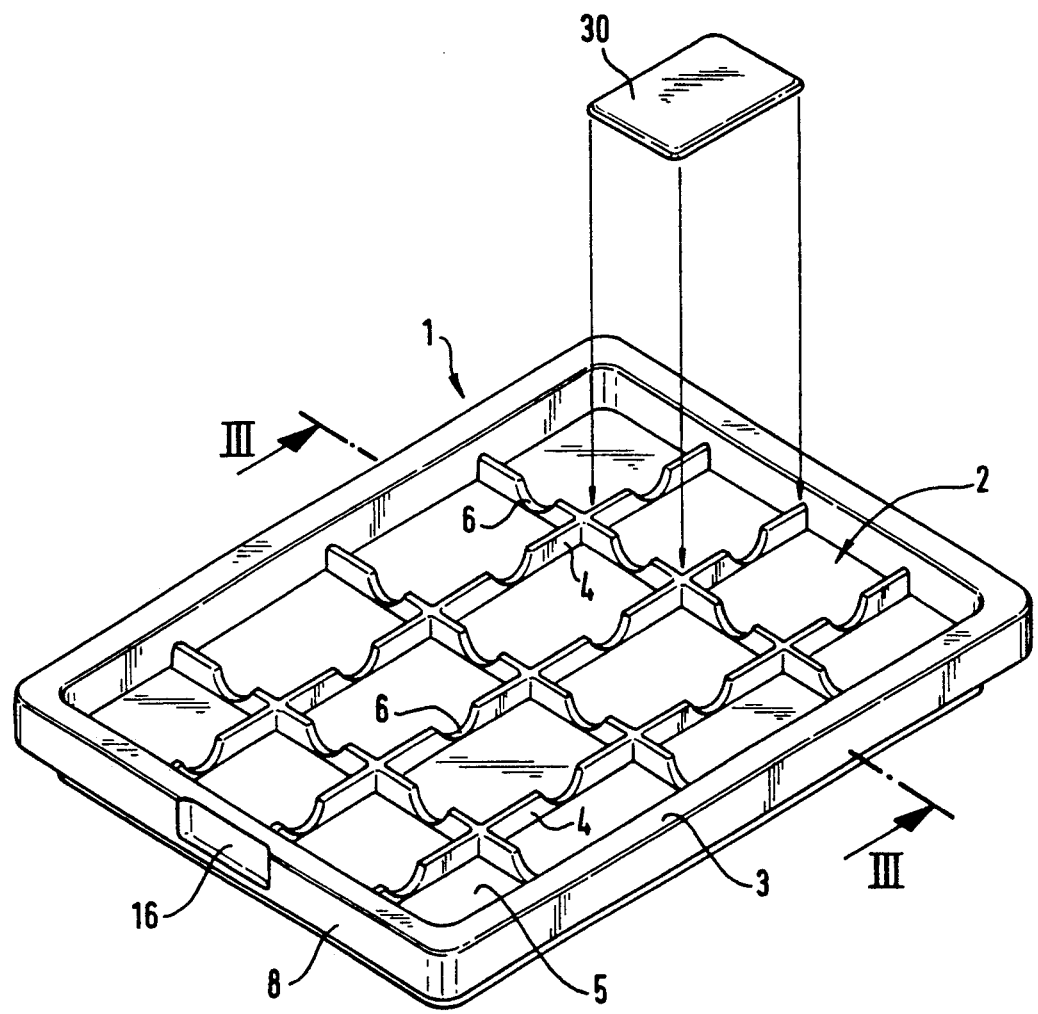
FIG. 1 shows a jewellery tray according to the invention in perspective view.

The jewellery tray shown in FIG. 1 and marked as a whole with 1 has a display section 2 and an edging 3, which is thickened relative to the display section. The top side of the display section 2 is divided with the aid of crosspieces 4 into a plurality of compartments 5, which are used to accommodate pieces of jewellery. The crosspieces 4 are interrupted by recesses 6 for taking hold.

The pieces of jewellery are often mounted on jewellery cushions 30, which fit into the compartments 5. Jewellery cushions and jewellery trays which match each other are also referred to as a jewellery display set.

Figure 2:
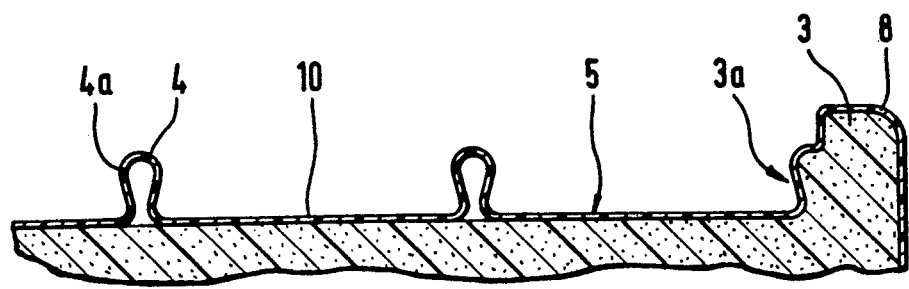
FIG. 2 shows a detail representation of a preferred cross-sectional form of crosspieces and edging of a jewellery tray.

According to a preferred embodiment of the invention, the crosspieces 4 are of such a shape, as shown in an exaggerated way in FIG. 2, that their cross-sectional area increases in the upward direction from the bottom surface 10 of the compartments 5. The inner sides 3a of the edging 3 of the tray 1 are correspondingly inclined inwards (towards the display section 2). The crosspieces 4 and the edging 5 are thus so formed that the width and length of the compartment at the height of the bulge 4a of the crosspieces 4 is slightly (preferably about 0.5–1.5 mm) smaller than in the neighbourhood of the bottom surface 10 of the compartments 5. The dimensions of the jewellery cushions 30 adapted to such trays 1 are slightly (preferably 0.2–0.5 mm) greater in the surface direction than the length and width of the compartments 5 at the height of the bulge 4a of the crosspiece 4. As a result, the jewellery cushions 30 inserted into the compartments 5 fit tightly with an elastic press fit, so that they cannot fall out during transport of the display set 1, 20. This is true even if pieces of jewellery are fastened on their surface, for example by sticking into the cushion, and the jewellery tray with the jewellery cushions and the pieces of jewellery are stood up vertically or even turned over. This constitutes an unusually valuable advantage in handling, especially for commercial travellers in the jewellery trade.

Figure 3:
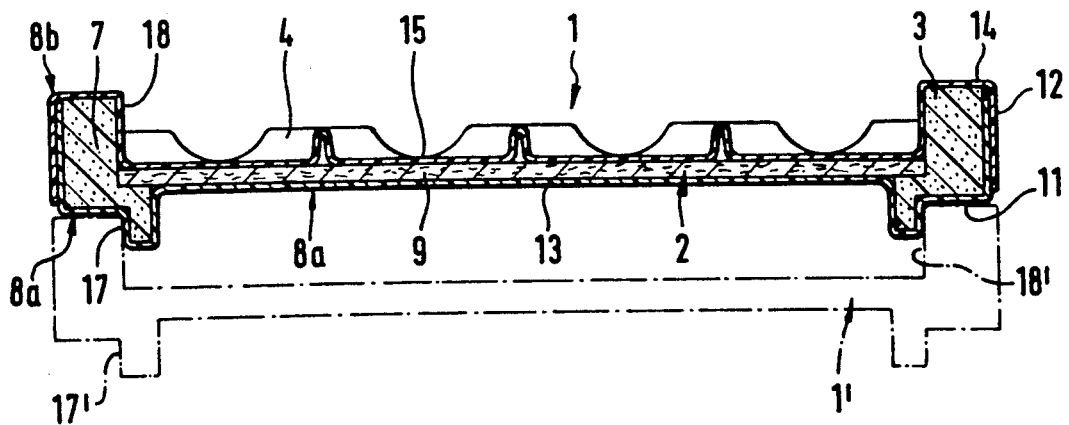
FIG. 3 shows a section along the line III—III in FIG. 1.

The construction can be understood better from FIG. 3. The edging 3 consists of a core 7 of rigid foam and a covering 8 of plastic sheeting. The display section 2 has a supporting sheet 9 of a thin but strong cardboard. In the preferred embodiment shown, the supporting sheet 9 is also covered with the sheeting 8. The sheeting is cemented to the supporting sheet 9 and to the rigid foam core 7 over at least the preponderant part of the surfaces in contact.

It is advantageous for the stability of all embodiments of the display trays according to the invention if the supporting sheet 9 of the display section 2 is covered at least in the region of its edge (to at least about 5 mm in width) by the sheeting 8 and cemented to it.

In the preferred embodiment shown the plastic sheeting covering 8 consists of two parts, in particular two plastic sheeting bodies 8a and 8b, which are preferably made by the drawing process. The first part (plastic sheeting body 8a) covers at least the bottom surface 11 and the side faces 12 of the edging 3. Beyond that, in the embodiment shown, it completely covers the bottom surface 13 of the display section 2. The second part of the plastic sheeting covering 8 (plastic sheeting body 8b) covers the top surface 14 and the side face 12 of the edging 3 as well as, in the preferred embodiment shown, the whole top surface 15 of the display section 2. In addition, in the region of the display section 2 the crosspieces 4 are impressed to separate the compartments 5. For reasons of weight saving it can be useful to provide recesses in the plastic sheeting 8, especially in the region of the compartments 5 between the crosspieces 4 and on the bottom surface 13 of the display section 2.

On the edging 3 a firm joint (e.g. cementing) should be provided of the plastic sheeting bodies 8a and 8b with each other and with the rigid foam core 7, at least in the region of the side face 12. Especially good stability can be achieved if, as shown, the two sheeting bodies 8a and 8b overlap each other in the region of the side face 12 of the edging 3, an overlap of a few millimeters having proved to be sufficient. Advantageously, the side face 12 has a label area 16 embossed in the plastic sheeting covering 8, as shown in FIG. 1.

In the embodiment shown, the side face 12 of the edging 3 runs largely straight. Depending on the design requirements, however, it can also be continuously curved, so that the edging 3 has the form of a round bead. The side face in the sense of the preceding description must be understood to be the side of the edging 3 facing away from the display section 2.

As has been mentioned, the jewellery trays I according to the invention are preferably stackable. For this purpose, the composite moulding which forms the edging has a stacking groove 17, which, in projection on the plane of the display section 2, runs approximately on the same line as the inside edge 18 of the edging 3. In FIG. 3, another jewellery tray 1' is indicated by a broken line in order to illustrate the interaction of the stacking groove 17 and the inside edge 18'.

Figure 4:
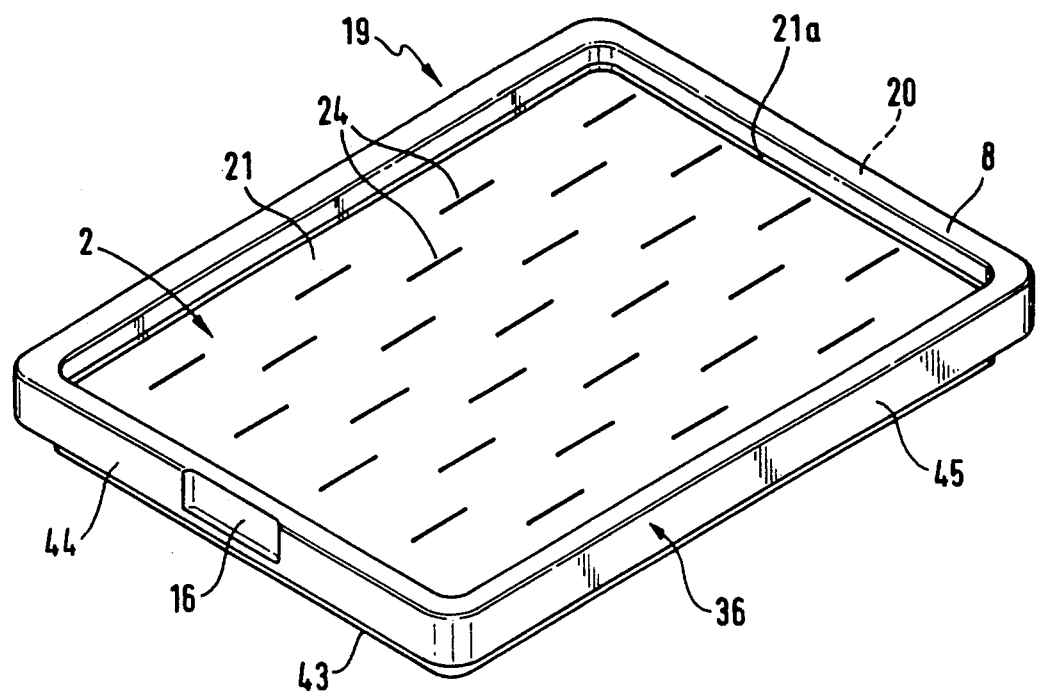
FIG. 4 shows a perspective view of a ring display tray.

FIG. 4 shows a ring tray 19, consisting of a flat composite moulding 20 and a ring-holding panel 21 disposed in its display section 2.

Figure 5:
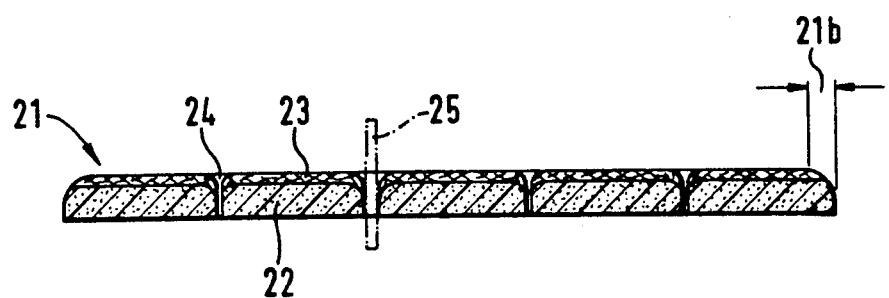
FIG. 5 shows a ring-holding panel in section.

The preferred ring-holding panel 21 shown in FIG. 5 consists of a foamed material base layer 22 and, cemented to it over the whole area, a skin 23 of textile material. Slits 24, cut vertically in the layered composite structure 22,23, serve to accommodate the rings. The rings (for clarity's sake only one ring 25 being shown, by a broken line) are held in the slits by the elasticity of the ring holding panel 1. It is advantageous in this connection if the slits 24 in the unstretched state are very narrow. Preferably they are simple incisions which are made in the layer composite structure 22,23 without removing any material.

The ring-holding panel 21 is formed in its edge region 21b in such a way that its thickness falls continuously towards the edge, its surface having a convex upward curvature as shown in FIG. 5. As a result an aesthetically attractive shadow-gap (21a in FIG. 4) is produced.

The composite moulding 20 shown in detail in FIGS. 5 to 8 consists of a rigid foam moulding 42 and a covering 8 of plastic sheeting. The edging 42a of the rigid foam moulding 42 thereby forms the core 7 of the edging 36 of the ring tray 19. In the region of the display section 2 the rigid foam moulding 42 forms the supporting sheet 35. The edging 36 is higher than the display section 2. Here also, on the bottom surface 37 of the edging 36, a peripheral stacking groove 38 is provided, whose size and disposition are so adapted to the shape of the top side 36a of the edging 36 that the ring trays are stackable.

Figure 6:
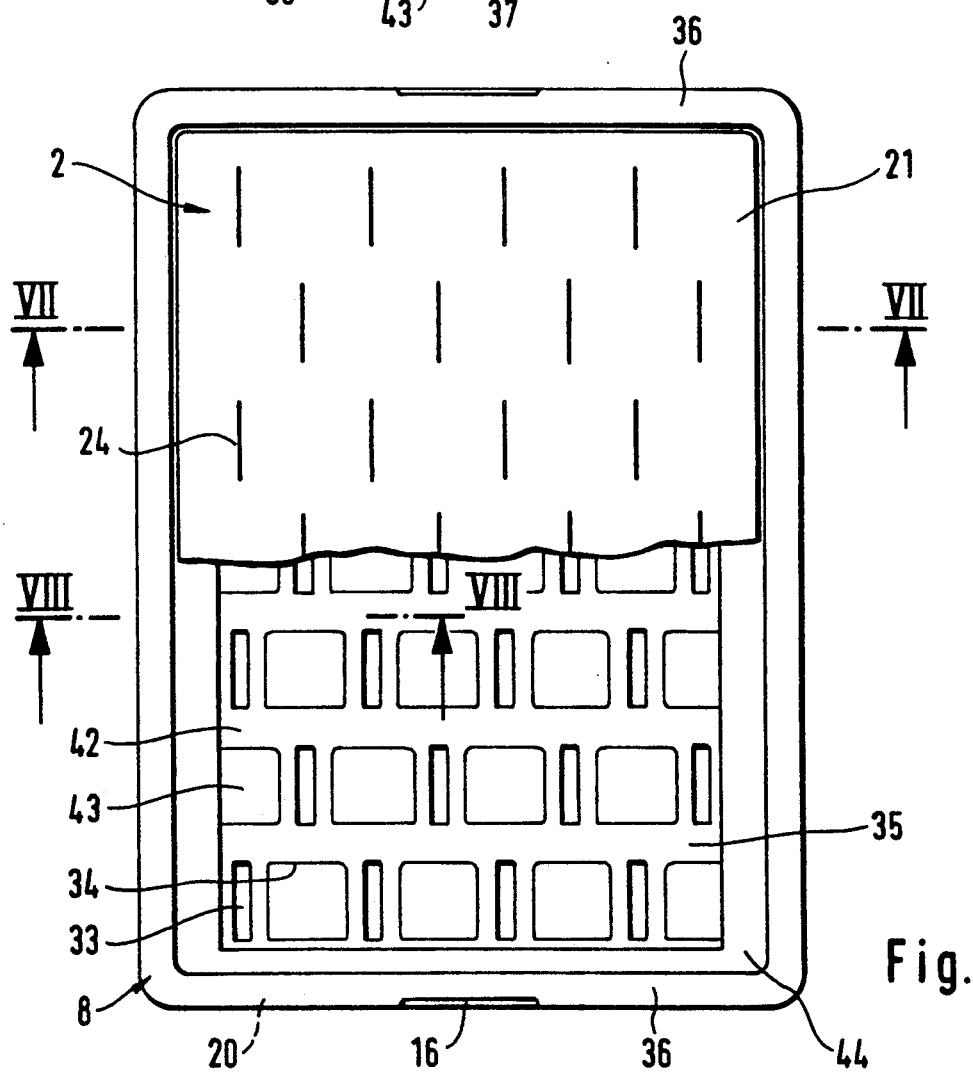
FIG. 6 shows a plan view of a ring tray according to FIG. 4.

As can be seen from FIGS. 6 and 7, recesses 33,34 are disposed in rows in the supporting sheet 35, and in each row narrow recesses 33 accessible from above alternate with wider recesses 34 accessible from below. In the successive rows the recesses are staggered in such a way that in each case a narrow recess 33 is disposed adjoining a wide recess 34 of the adjoining row.

Figure 7:
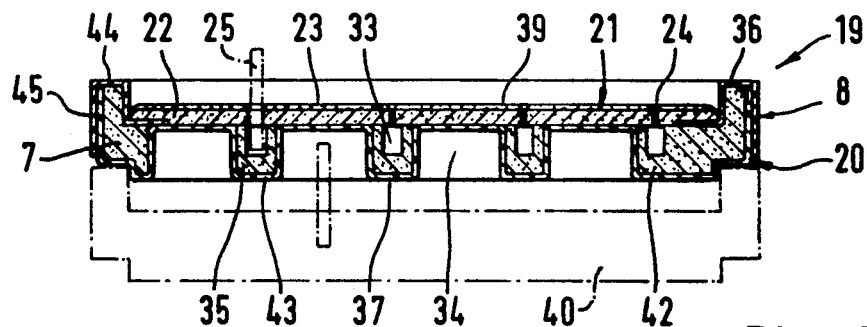
FIG. 7 shows a section along the line VII—VII in FIG. 6.

The slits 24 are in each case disposed above the narrow recesses 33, so that a ring, also shown in FIG. 7 by a broken line, inserted into a slit 24 penetrates into the recess 33.

The wide recesses 34 accessible from below provide space for rings situated in another ring tray 40, indicated merely by a broken line in FIG. 7, stacked below the ring tray 19. This is possible since the recesses 13, 14 are disposed in the way visible in FIG. 6, so that in each case a narrow recess Is disposed above a wide recess if the alternate display trays in a stack are each rotated by 180 relative to each other.

Figure 8:
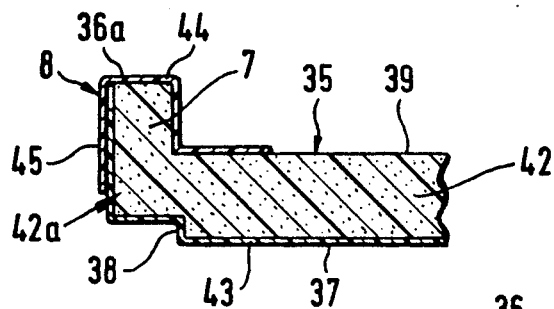
FIG. 8 shows a section along the line VIII—VIII in FIG. 6.

As can be seen especially clearly in FIGS. 7 and 8, in this embodiment also the covering 8 of plastic sheeting preferably consists of two parts, namely plastic sheeting bodies 43 and 44. The lower plastic sheeting body 43 encloses the bottom surface 37 of the rigid foam moulding 42 including a part of the side surface 45 of the edging 36. The upper plastic sheeting body 44 covers the top surface 36a of the edging 36 and is bonded to the supporting sheet 35 in the edge region of the latter, on the side surface 25 it overlaps the lower plastic sheeting body 43 and is cemented to it.

I claim:

1. A display tray for displaying and transporting objects, said display tray comprising:
   a central planar member having a predetermined thickness, said central planar member having an upper and a lower surface;
   a frame surrounding said central planar member, said frame being thicker in cross section than said thickness of said central planar member, said frame comprising rigid foam;
   a first plastic sheeting body disposed upon said central planar member and said frame, said first plastic sheeting body covering a portion of said upper surface of said central planar member and a first portion of said frame;

a second plastic sheeting body disposed upon said central planar member and said frame, said second plastic sheeting body covering a portion of said lower surface of said central planar member and a second portion of said frame;

wherein said first and second sheeting bodies are permanently bonded together around an outer periphery of said frame, and wherein said upper surface of said central planar member forms a display surface for supporting objects to be displayed and transported.

2. The display tray according to claim 1, wherein the first plastic sheeting body covers said portion of the upper surface of the central planar member in an area adjacent the frame.

3. The display tray according to claim 2, wherein the first plastic sheeting body forms the display surface, and the first plastic sheeting body is impressed to create compartments and crosspieces for separating the compartments, and wherein a top of the crosspieces form a top of the compartments.

4. The display tray according to claim 3, wherein the crosspieces which separate the compartments and the inner sides of the frame are so formed that a width and a length of the compartments are greater at a bottom surface of the compartments than at the top of the compartments.

5. The display tray according to claim 1, wherein the first plastic sheeting body overlaps the second plastic sheeting body on the outer periphery of the frame, and the plastic sheeting bodies are bonded together at the overlap.

6. The display tray according to claim 1, wherein said first plastic sheeting body is bonded to the central planar member at last in a region adjacent to the frame.

7. A process for manufacturing a display tray for displaying and transporting objects, said process comprising the steps of:

moulding rigid foam to form a core of the display tray, said core having a central planar section having an upper and a lower surface thereof and a frame surrounding said central planar section, said frame being thicker in cross section than a thickness of an outer portion of said central planar section;

moulding a top thermoplastic sheet to a shape which corresponds to a portion of a cross section of the core, wherein the top thermoplastic sheet has a portion which corresponds to a shape of a first portion of the frame and a portion which responds to a shape of a portion of the upper surface of the central planar section;

moulding a bottom thermoplastic sheet to a shape which corresponds to a shape of a second portion of the frame and a portion of the lower surface of the central planar section;

assembling the top and bottom thermoplastic sheets with the core therebetween; and permanently bonding the top thermoplastic sheet to the bottom thermoplastic sheet at an outer periphery thereof.

8. A process for manufacturing a display tray for displaying and transporting objects, said process comprising the steps of:

providing a central planar member, said central planar member having an upper and a lower surface thereof, and an outer periphery;

moulding rigid foam to form a frame, said frame being configured to surround said outer periphery of said central planer member, said frame having a thickness in cross section which is greater than a thickness of said central planar member;

surrounding said central planar member with said frame;

moulding a top thermoplastic sheet to a shape which corresponds to a first portion of a cross section of the frame and a portion of the upper surface of the central planar member;

moulding a bottom thermoplastic sheet to a shape which corresponds to a shape of a second portion of the frame and a portion of the lower surface of the central planar member;

assembling the top and bottom thermoplastic sheets with the frame and the central planar member therebetween; and permanently bonding the top thermoplastic sheet to the bottom thermoplastic sheet at an outer periphery thereof.

9. A display tray for displaying and transporting objects, said display tray comprising:

a central planer member having an inner section and an outer periphery, said outer periphery having a predetermined thickness which remains constant therealong, said central planar member having an upper and a lower surface;

a frame surrounding said central member, said frame being thicker in cross section than said thickness of said outer periphery of said central planar member, said frame comprising rigid foam;

a first plastic sheeting body disposed upon said central member nd said frame, said first plastic sheeting body covering a portion of said upper surface of said central member and a first portion of said frame;

a second plastic sheeting body disposed upon said central member and said frame, said second plastic sheeting body covering a portion of said lower surface of said central member and a second portion of said frame;

wherein said first and second sheeting bodies are permanently bonded together around an outer periphery of said frame, and wherein said upper surface of said central member forms a display surface for supporting objects to be displayed and transported.

10. A display trap for displaying and transporting objects, said display tray comprising:

a core or rigid foam, said core comprising a central area having a predetermined thickness at an outer portion thereof, and a frame surrounding said central area, said frame being thicker in cross section than said outer portion of said central area;

a first plastic sheeting body disposed upon said core, said first plastic sheeting body covering a portion of said core which includes a first portion of the frame and a portion of an upper surface of the central area;

a second plastic sheeting body disposed upon said core, said second plastic sheeting body covering a portion of a lower surface of said central area and a second portion of said frame;

wherein said first and second sheeting bodies are permanently bonded together around an outer periphery of said frame, and wherein said upper surface of said core forms a display surface for supporting objects to be displayed and transported.

11. A display tray for displaying and transporting objects, said display tray comprising:
- a central generally planar member having a predetermined thickness, said central generally planar member having an upper and a lower surface, and a plurality of recesses at least in said upper surface;
- a frame surrounding said central generally planar member, said frame being thicker in cross section than said thickness of said central generally planar member, said frame comprising rigid foam;
- a first plastic sheeting body disposed upon said central generally planar member and said frame, said first plastic sheeting body covering a portion of said upper surface of said central generally planar member and a first portion of said frame;
- a second plastic sheeting body disposed upon said central generally planar member and said frame, said second plastic sheeting body covering a portion of said lower surface of said central generally planar member and a second portion of said frame, wherein said first and second sheeting bodies are permanently bonded together around an outer periphery of said frame; and
- a ring-holding panel of foamed material, said ring-holding panel including slits formed as ring sockets, said ring-holding panel being disposed on said upper surface of said central planar member;
- wherein said slits in said ring-holding panel correspond to some of said plurality of recesses in said central generally planar member, wherein said recesses accommodate ring-type objects when said objects are inserted into said slits.

* * * * *